United States Patent
Bjelland et al.

(10) Patent No.: US 6,856,612 B1
(45) Date of Patent: Feb. 15, 2005

(54) METHODS AND SYSTEMS FOR CALL ROUTING AND CODEC NEGOTIATION IN HYBRID VOICE/DATA/INTERNET/WIRELESS SYSTEMS

(75) Inventors: Frode Bjelland, Arendal (NO); Karl Hellwig, Wonfurt (DE); Frank Hundscheidt, Kerkrade (NL); George Vergopoulos, Athens (GR); Jerker Widmark, Sundybergh (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/505,168

(22) Filed: Feb. 17, 2000

Related U.S. Application Data

(60) Provisional application No. 60/121,496, filed on Feb. 24, 1999.

(51) Int. Cl.[7] .............................................. H04Q 7/24
(52) U.S. Cl. .................. 370/338; 370/353; 370/389; 370/401; 370/410; 370/426; 370/467; 370/496; 370/522
(58) Field of Search ................................ 370/264, 352, 370/353, 410, 426, 496, 522, 328, 335, 337, 338, 356, 389, 401, 469, 466, 467; 455/433, 445

(56) References Cited

U.S. PATENT DOCUMENTS

| | | | | |
|---|---|---|---|---|
| 5,881,131 A | * | 3/1999 | Farris et al. | 379/15.03 |
| 6,141,345 A | * | 10/2000 | Goeddel et al. | 370/389 |
| 6,421,339 B1 | * | 7/2002 | Thomas | 370/352 |
| 6,567,398 B1 | * | 5/2003 | Aravamudan et al. | 370/352 |
| 6,570,871 B1 | * | 5/2003 | Schneider | 370/356 |
| 6,594,253 B1 | * | 7/2003 | Sallberg et al. | 370/349 |
| 6,608,832 B2 | * | 8/2003 | Forslow | 370/353 |

FOREIGN PATENT DOCUMENTS

| | | |
|---|---|---|
| EP | 0439926 A | 8/1991 |
| WO | WO95/08875 | 3/1995 |

\* cited by examiner

*Primary Examiner*—Dang Ton
*Assistant Examiner*—Inder Pal Mehra

(57) ABSTRACT

A method and system for communicating information includes evaluation regarding routing of calls performed at a call control point in an ITSP and/or wireless network. A PIC identity associated with another party's preferences is acquired and sent to the call control point. The PIC identity identifies the type of the carrier network (e.g., circuit switched or VoIP) and is used to make further routing decisions. If a circuit-switched carrier is identified, the IP homing leg is terminated at the voice gateway in the recipient's HPLMN and information is sent over to the GMSC where normal, circuit-switched routing procedures. If a VoIP carrier is identified then the called user's roaming number is retrieved from the HLR, and the call is further routed directly over the IP domain towards a voice gateway at the visited network minimizing the number of transcodings. Additional transcoding steps can be avoided if a single encoding is agreed upon according to "tandem free operation" (TFO). Combining inband signaling through the telephony exchanges and out-of-band signaling in the IP network it is possible to achieve, for a mobile subscriber, one encoding and one decoding of a voice.

28 Claims, 8 Drawing Sheets

(12) United States Patent

US 6,856,612 B1

METHODS AND SYSTEMS FOR CALL ROUTING AND CODEC NEGOTIATION IN HYBRID VOICE/DATA/INTERNET/ WIRELESS SYSTEMS

RELATED APPLICATION

This application is related to, and claims priority from, U.S. Provisional Patent Application Ser. No. 60/121,496, entitled "Methods and Systems for Call Routing and CODEC Negotiation in Hybrid Voice/Data/Internet/ Wireless Systems", filed on Feb. 24, 1999, the disclosure of which is incorporated here by reference.

BACKGROUND

The present invention generally relates to routing and coding in the field of communication systems and, more particularly, to routing and coding of signals which may be transmitted over various different types of communication systems, e.g., packet-switched, circuit-switched, wireline, wireless, Internet, etc., enroute between two parties.

The growth of commercial communication systems and, in particular, the explosive growth of cellular radiotelephone systems, have compelled system designers to search for ways to increase system capacity without reducing communication quality beyond consumer tolerance thresholds. One technique to achieve these objectives involved changing from systems wherein analog modulation was used to impress data onto a carrier wave, to systems wherein digital modulation was used to impress the data on carrier waves.

Another recent trend in telecommunications is the advent of the Internet. Of particular interest in this context is the capability to carry telephone calls over the Internet using packet-switching based on the Internet Protocol (IP). This type of service is sometimes referred to as "voice over IP"(VoIP). For example, as shown in FIG. 1, a user A can communicate with a user B using Internet and VoIP techniques as communication interface between their respective public switched telephone networks (PSTNs).

Given the growing usage of this type of wireline-based service, it would be useful to also be able to use VoIP techniques in conjunction with wireless communication systems. However, such a combination raises several issues in terms of call routing, overhead signalling and coding. Consider the following examples.

The equal access function (planned for implementation within the GSM networks) allows a subscriber to choose a default carrier from among several interexchange carriers (IXC) for national long distance and international communication "legs", i.e., transmissions between home and visiting public land mobile networks (HPLMNs and VPLMNs). A call to a mobile, e.g., GSM, user is typically first routed to the home network (which routing is referred to herein as the "homing leg") and then further to the visited network (which routing is referred to herein as the "roaming leg"). In a mobile-to-mobile call, equal access can be used from the calling subscriber on the homing leg (i.e., from $VPLMN_A$ to $HPLMN_B$ in FIG. 2) and the called subscriber roaming leg (i.e., from $HPLMN_B$ to $VPLMN_B$ in FIG. 2) This means that the calling subscriber can select the IXC for the homing leg (which carrier may also be an Internet telephony service provider (ITSP) as well on a pre-selection and/or on a call-by-call basis by using a specific prefix in front of the dialed destination number. The IXC to be used for the roaming leg is indicated by the Primary Interexchange Carrier (PIC) identity, as stored in the user's profile in HLR.

Permitting the uncoordinated introduction of VoIP on the roaming leg can introduce unpredictable speech quality (e.g., associated with multiple transcodings) and long call delays. For example, in the case that the mobile terminating call is coming from the circuit switched domain, then the gateway mobile switching center (GMSC) will eventually route the call towards the nearest voice gateway in its domain if the primary inter-exchange carrier (PIC) identity indicates a VoIP IXG for the roaming leg. If, on the other hand, the incoming call comes from the IP domain (e.g., using an ITSP's VoIP network), then the call will unnecessarily undergo multiple conversions between the IP and circuit switched domain. The multiple transcodings between the different codecs used on the IP and circuit switched call legs will degrade the speech quality and add significant delays on the speech path. Th is problem will be more evident upon review of FIG. 2 which illustrates a call between two mobile users which is routed over two VoIP legs.

Therein, an initial coding (e.g., compression of voice information, also referred to as source or speech coding) is applied to the information at the mobile station 20 prior to transmission over the air interface. The particular coding algorithm is defined by the applicable air interface standard, in this example that defined in the GSM 06.10 standard and referred to herein simply as the "GSM codec". Next, the received information is transcoded in the BSC/TRC from the GSM codec to a G-711 codec (e.g., an ordinary PCM codec as defined by G.711) for transmission within nodes of the $VPLMN_a$. Since, in this example, a VoIP bypass 22 is used to route the call on the homing leg, another transcoding is performed in the VoIP gateway 24. For example, the information can be transcoded from G.711 to a low bit-rate code (e.g, that specified in G.723.1 or G.729) for transmission over an IP network 22. Once the information reaches the recipient user's $HPLMN_b$, it is again transcoded at gateway 26, i.e., from the low bit-rate code back into PCM code for routing within the HPLMN nodes. Routing information is obtained from the home location register (HLR) 28 in order to route the call to the MSC 34 which is currently supporting mobile communications with the recipient. Then, the information is again transcoded at gateway 30 and transmitted over the VoIP roaming leg network 32. At the $VPLMN_b$, the information is once again transcoded into PCM for routing therein. Finally, the information is again transcoded into the GSM codec mode and transmitted over the air interface to mobile unit 36.

It can be seen that, in this example wherein VoIP is used for both the homing and roaming leg, a total of six transcodings can take place. Each conversion between coding standards reduces speech quality, and each encoding to a low bitrate codec adds about 20–30 ms delay (i.e., which is primarily attributable to waiting for enough speech data to generate a codec frame). Further transcodings can occur if, for example, other services such as call forwarding or conference calling are invoked. This means that the received speech quality becomes unpredictable, since it becomes dependent on the particular traffic case and on the various codecs (e.g., different standards may be used in different segments such as GSM over the first air interface and DAMPS over the second) applied to segments in the call.

One way to avoid this difficulty is to use the PCM coding on the homing and roaming IP legs. This reduces the number of transcodings to two from the six transcodings in the previous example. More specifically, the only transcodings needed to implement this solution would be performed upon receiving information from the originator over the air interface ($TR_1$) and prior to transmitting information to the recipient over the air interface ($TR_2$). The IP links 40 and 42 would convey information using the same encoding as the PLMNs, as shown in FIG. 3. However, this solution provides none of the transmission capacity savings which are available if the low bit rate coding is employed over the IP legs. For example, using codec G723.1 over the IP legs would provide a transmission capacity savings factor of 10 relative to PCM encoding. Moreover, to enable the common usage of G.711 coding over all legs in practice, all parties involved would have to agree to only use this type of coding.

Accordingly, it would be desirable to provide enhanced techniques for routing and coding of calls which use various systems to route information between two parties.

SUMMARY

These and other drawbacks and limitations of conventional methods and systems for communicating information are overcome according to exemplary embodiments of the present invention, wherein evaluation regarding routing of calls is performed at a call control point (e.g., a gatekeeper) in the ITSPs and/or wireless network. According to an exemplary embodiment, the PIC identity associated with the recipient party's preferences is acquired from, for example, the recipient's HPLMN and sent to the gatekeeper. The PIC identity is used by the gatekeeper to identify the type of the carrier network (e.g., circuit switched or VoIP) to be used to route information to the recipient and is used by the gatekeeper to make further routing decisions.

For example, in the case that the PIC identity sent to the gatekeeper identifies the preferred carrier as a circuit-switched carrier, then the IP homing leg is terminated at the voice gateway in the recipient's HPLMN and the information is sent over to the GMSC where normal, circuit-switched routing procedures (e.g., those defined in the GSM standard for routing calls to a roaming mobile user) will apply. If instead a VoIP carrier is identified by the gatekeeper based on the PIC identity, then the gatekeeper retrieves from the HLR the called user's roaming number, which is used to further route the call directly over the IP domain towards a voice gateway at the visited network. In this latter case, the call need not be routed through the HPLMN of the called user and both delay and the number of transcodings can be minimized.

According to another exemplary embodiment of the present invention, additional transcoding steps (possibly all transcoding) can be avoided if the communication nodes can agree on a single encoding, that is if so-called "tandem free operation" (TFO) can be made to work end-to-end for IP-telephony. In the general case, this would imply voice gateways being able to extend TFO negotiation on the circuit switched call legs towards the IP call legs and vice versa.

By combining inband signalling (e.g., as set forth in GSM TS 04.53, which is incorporated here by reference) through the telephony exchanges and outband signalling in the IP network (e.g., as set forth in H.245, SDP, RTCP, which documents are incorporated here by reference), it is possible to achieve one encoding and one decoding of the speech, end-to-end, when a mobile subscriber is involved. Alternatively, this method can be used on parts of the call to minimize the number of transcodings. By negotiating a suitable format of encoded speech, the bandwidth used in the IP network can be minimized.

BRIEF DESCRIPTION OF THE DRAWINGS

These and other objects, features and advantages of the present invention will become more apparent upon reading from the following detailed description, taken in conjunction with the accompanying drawings, wherein.

DETAILED DESCRIPTION

The following exemplary embodiments are provided in the context of communication systems, a portion of which are TDMA radiocommunication systems. However, those skilled in the art will appreciate that this access methodology is merely used for the purposes of illustration and that the portions of the communication systems which involve radio links according to the present invention can be implemented using any type of access methodologies including frequency division multiple access (FDMA), TDMA, code division multiple access (CDMA) and hybrids thereof.

Moreover, operation in accordance with GSM communication systems is described in European Telecommunication Standard Institute (ETSI) documents ETS 300 573, ETS 300 574 and ETS 300 578, which are hereby incorporated by reference. Therefore, the operation of the GSM system is only described herein to the extent necessary for understanding an exemplary manner in which wireless access can be made to a communication system in accordance with the present invention. Although, the present invention is described in terms of exemplary embodiments involving a GSM system, those skilled in the art will appreciate that the wireless access made according to the present invention could be provided using a wide variety of other digital communication systems, such as those based on wideband CDMA, wireless ATM, DAMPS, PDC, etc.

Figure 1:
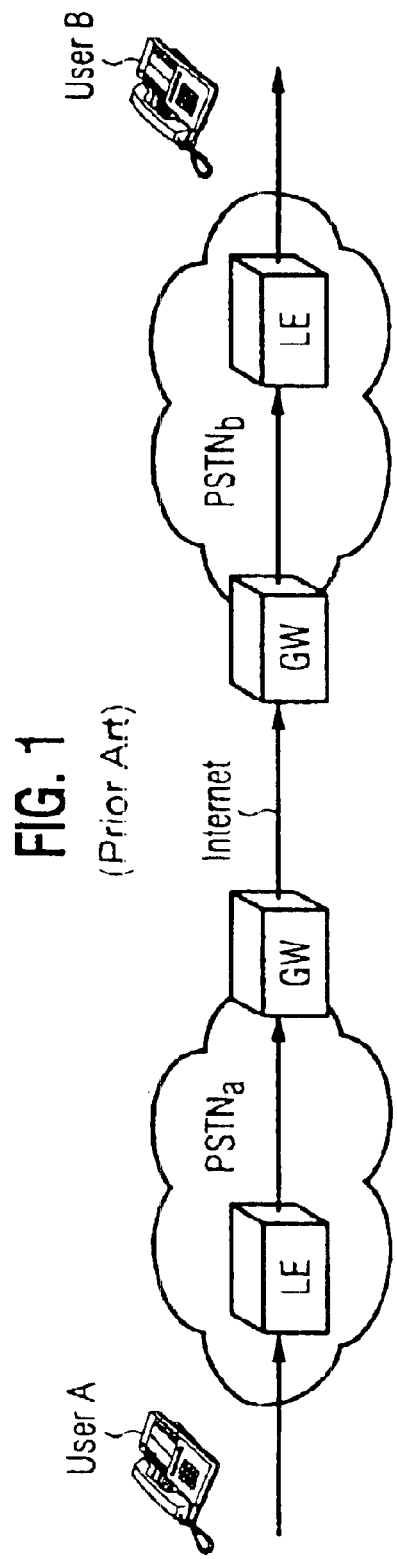
FIG. 1 is a diagram illustrating voice over the Internet in conjunction with a wireline-based system.
Figure 2:
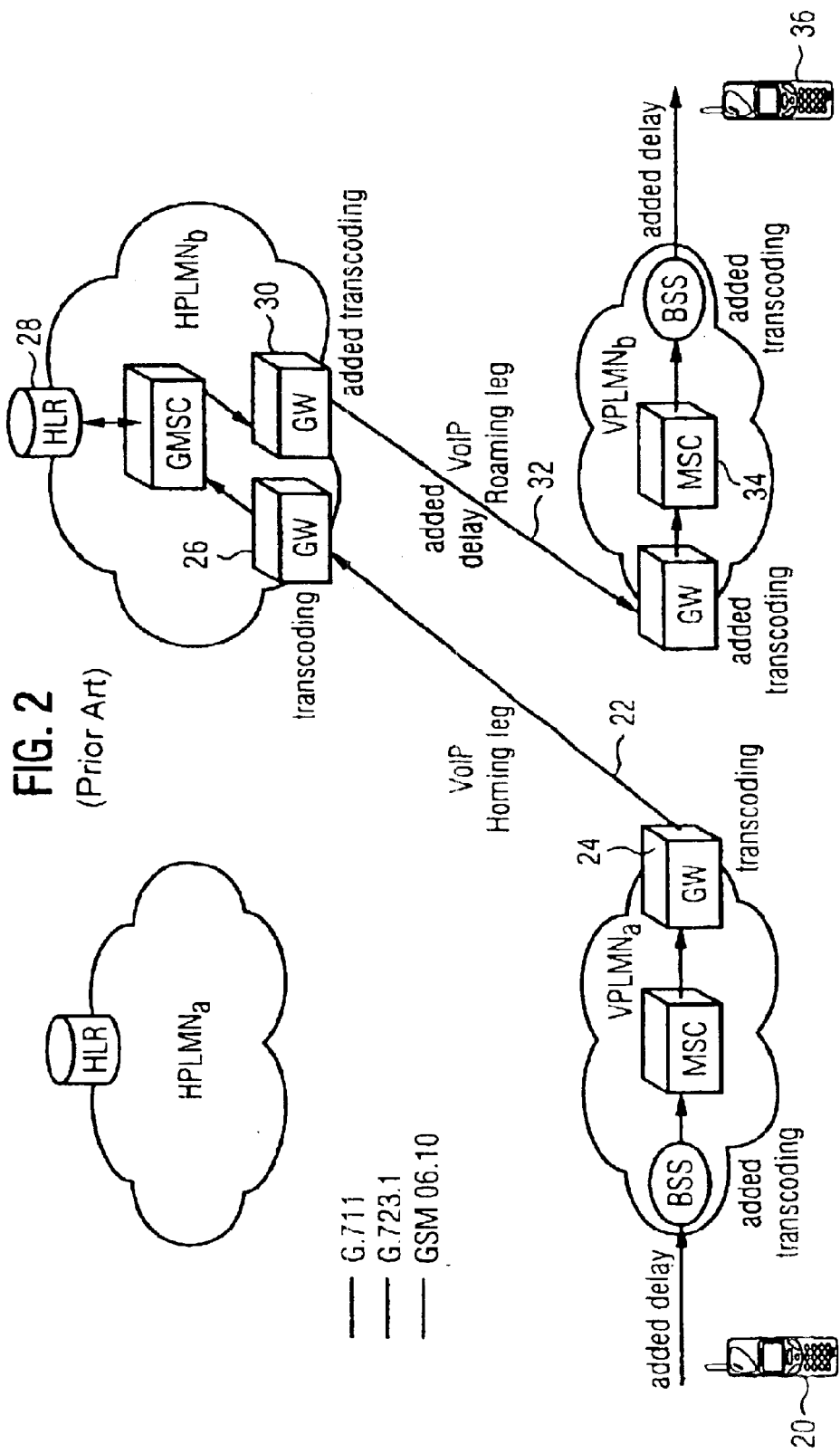
FIG. 2 is a diagram illustrating exemplary delays and transcodings associated with one implementation of VoIP between two wireless terminals.
Figure 3:
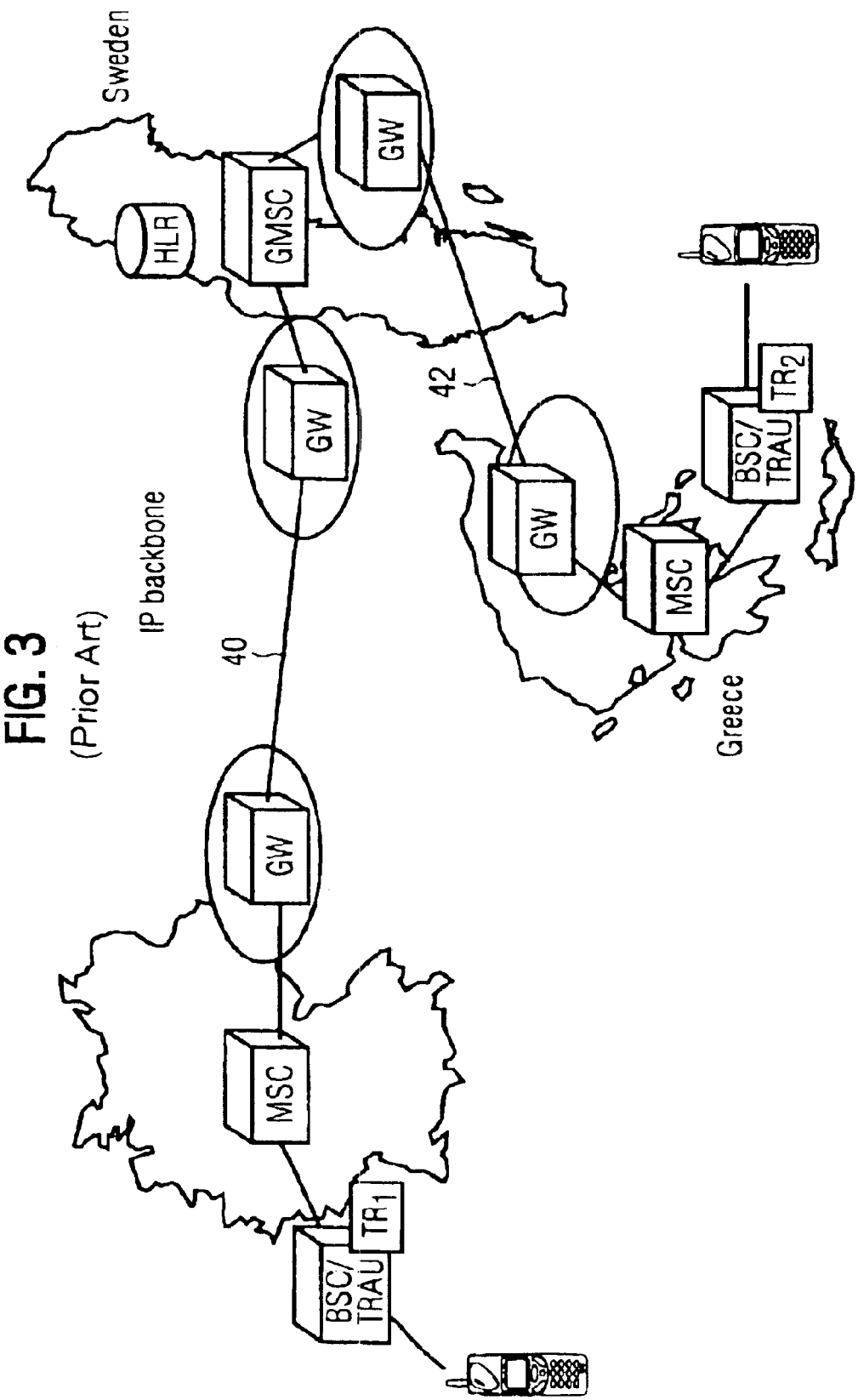
FIG. 3 is a diagram illustrating exemplary delays and transcodings associated with another implementation of VoIP between two wireless terminals wherein transcoding is not performed between PLMNs and IP networks.
Figure 4:
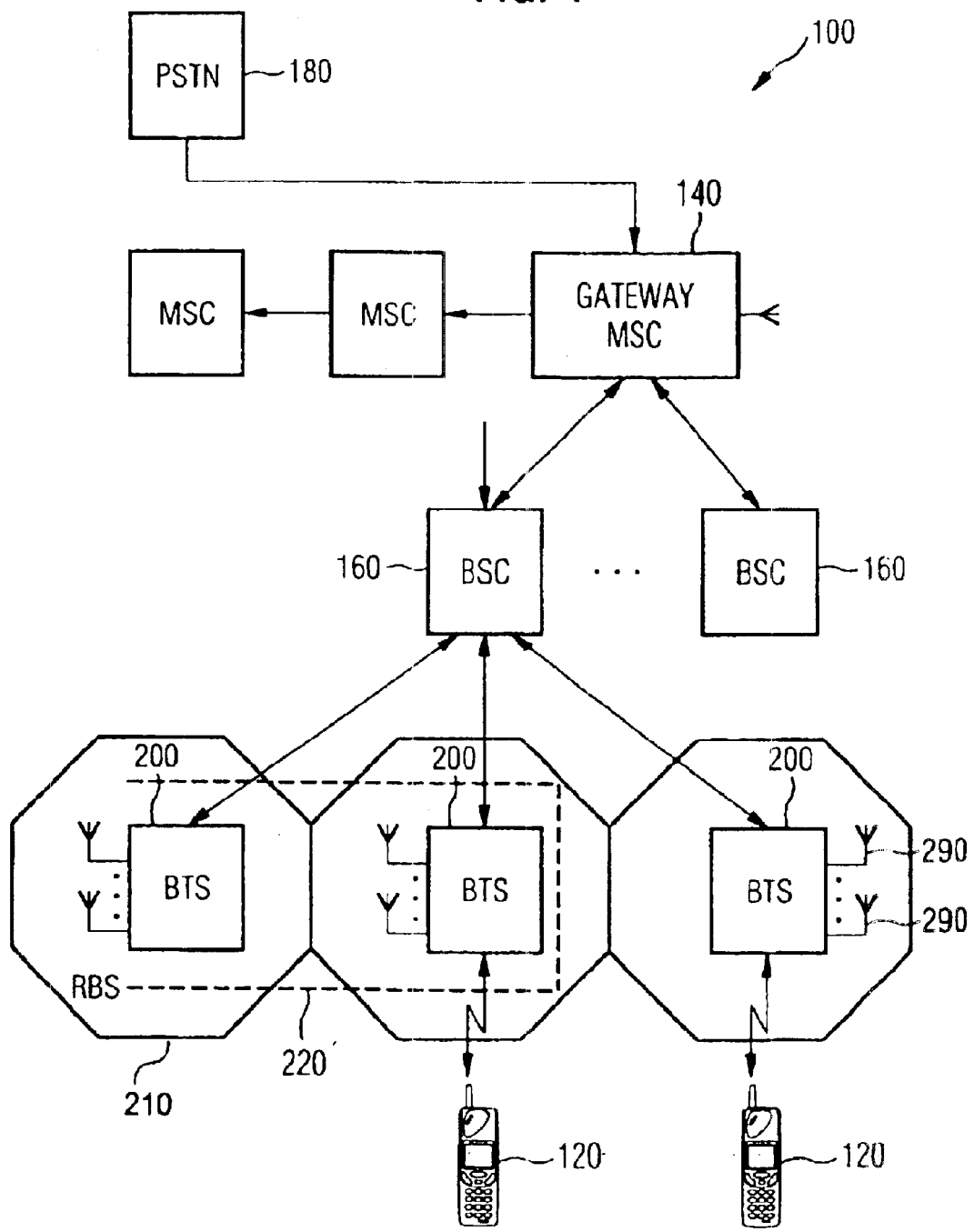
FIG. 4 is a diagram illustrating an exemplary GSM radiocommunication system which can be used to make wireless accesses to a communication system in accordance with the present invention.

Referring to FIG. 4, a communication system 100 according to an exemplary GSM embodiment of the present invention is depicted. The system 100 is designed as a hierarchical network with multiple levels for managing calls. Using a set of uplink and downlink frequencies, mobile stations 120 operating within the system 100 participate in calls using time slots allocated to them on these frequencies. At an upper hierarchical level, a group of Mobile Switching Centers (MSCs) 140 are responsible for the routing of calls from an originator to a destination. In particular, these entities are responsible for setup, control and termination of calls. One of the MSCs 140, known as the gateway MSC (GMSC), handles communication with a Public Switched Telephone Network (PSTN) 180, or other public and private networks.

At a lower hierarchical level, each of the MSCs 140 are connected to a group of base station controllers (BSCs) 160.

Under the GSM standard, the BSC 160 communicates with a MSC 140 under a standard interface known as the A-interface, which is based on the Mobile Application Part of CCITT Signaling System No. 7. At a still lower hierarchical level, each of the BSCs 160 controls a group of base transceiver stations (BTSs) 200. Each BTS 200 includes a number of TRXs (not shown) that use the uplink and downlink RF channels to serve a particular common geographical area, such as one or more communication cells 210. The BTSs 200 primarily provide the RF links for the transmission and reception of data bursts to and from the mobile stations 120 within their designated cell. When used to convey packet data, these channels are frequently referred to as packet data channels (PDCHs). In an exemplary embodiment, a number of BTSs 200 are incorporated into a radio base station (RBS) 220. The RBS 22 may, for example, be configured according to a family of RBS-2000 products, which products are offered by Telefonaktiebolaget L M Ericsson, the assignee of the present invention. For more details regarding exemplary mobile station 120 and RBS 220 implementations, the interested reader is referred to U.S. patent application Ser. No. 08/921,319, entitled "A Link Adaptation Method For Links using Modulation Schemes That Have Different Symbol Rates", to Magnus Frodigh et al., the disclosure of which is expressly incorporated here by reference.

Figure 5:
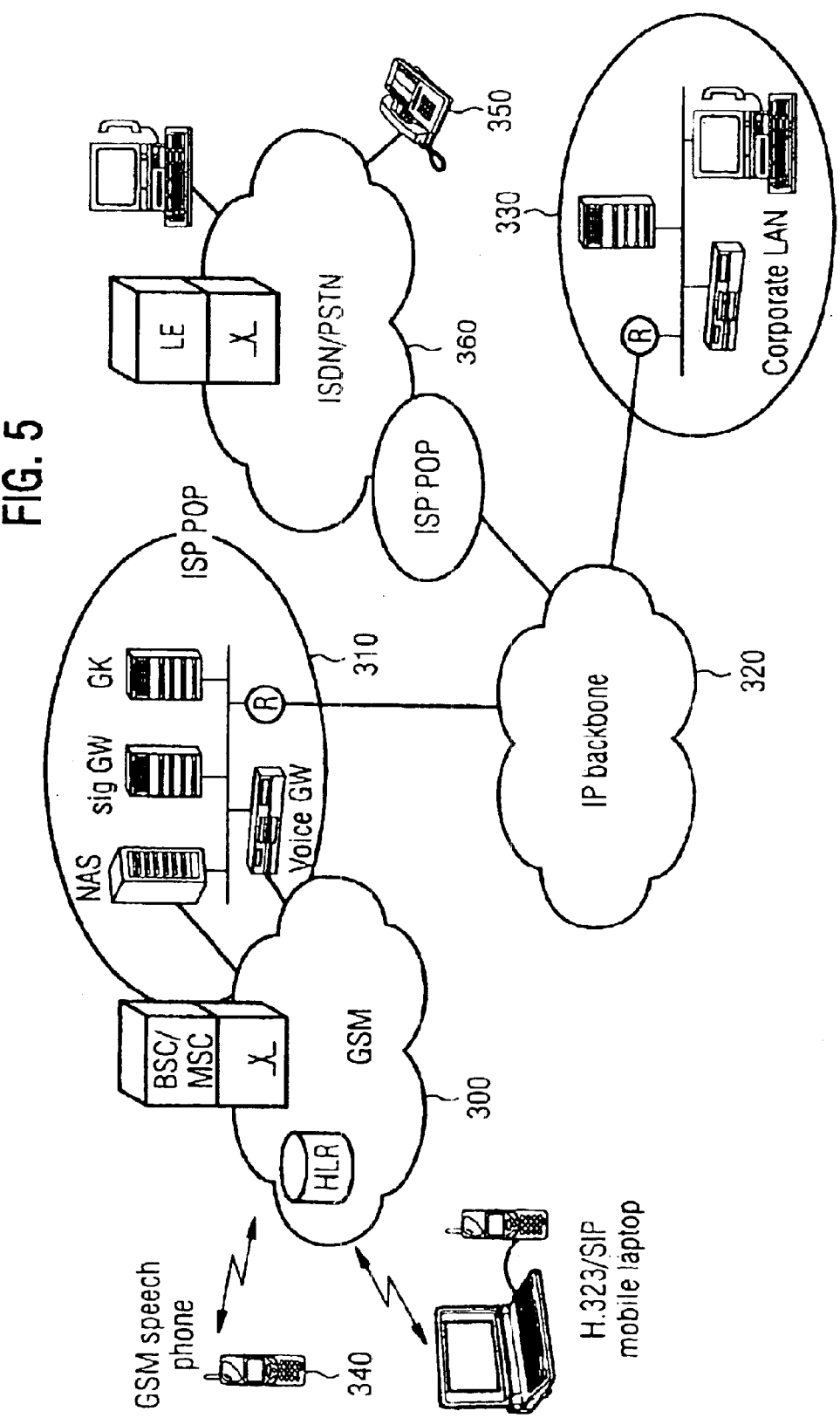
FIG. 5 is a diagram illustrating exemplary interconnections between a wireless communication system, a PSTN and a corporate local area network (LAN) through the Internet in accordance with the present invention.

In addition to being directly connected to a PSTN 360, a GSM radiocommunication system 300 can also be connected to a PSTN 360 through the Internet as seen in FIG. 5. Therein, the GSM system 300 is connected (via an NAS and voice gateway) through an Internet service provider 310 to the IP backbone or Internet 320. In addition to PSTN 310, the Internet 320 is also connected to a corporate LAN 330 to provide a further example of the types of systems over which information may be conveyed between two (or more) terminal devices according to the present invention.

Figure 6:
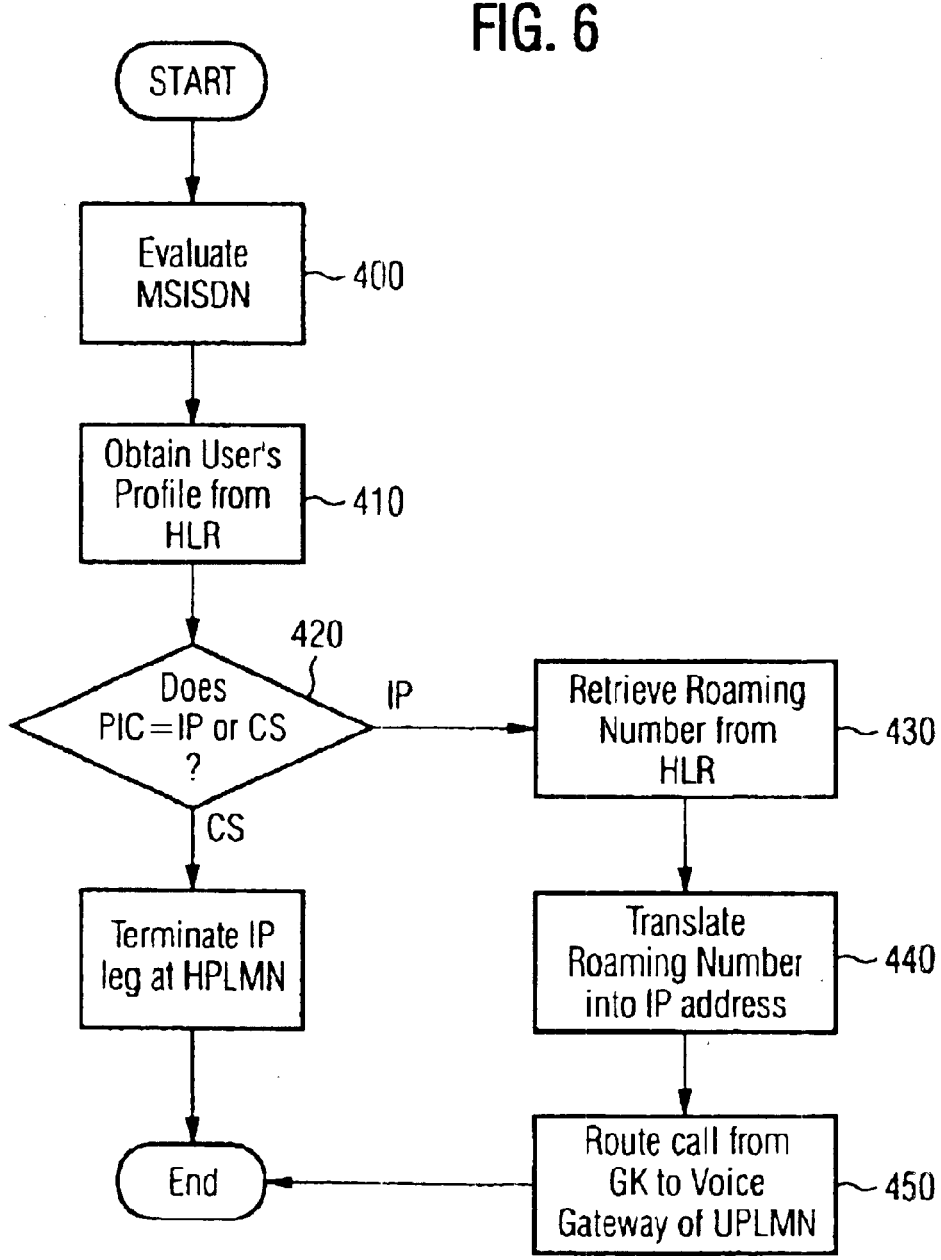
FIG. 6 is a flow chart illustrating a method for routing calls in accordance with an exemplary embodiment of the present invention.

According to an exemplary embodiment of the present invention, routing of calls between, for example, a GSM cellular phone 340 and fixed (wireline) telephone 350 can be simplified by evaluating the calls at a gatekeeper, which can e.g., be either the GSM system 300 or the ISP 310 in the exemplary system of FIG. 5. The gatekeeper obtains routing information and forwards the calls directly to a destination based on the type of carrier to be used and the routing information obtained from a user's profile. An exemplary method according to the present invention is illustrated in the flow chart of FIG. 6. First, at step 400, the gatekeeper can perform a number analysis on the directory number (e.g., the MSISDN) included in the call setup message received from the mobile terminal placing the call in order to identify that it is a mobile user. Then, the gatekeeper can download the user's profile from its HLR using, for example, a MAP operation at step 410. Those skilled in the art will be familiar with CCITT signaling generally and MAP operations, specifically, so a further discussion of such operations is omitted here. At step 420, the gatekeeper determines whether the PIC identity included in the user's profile is associated with an IP carrier or a circuit-switched carrier. If the PIC identity indicates that an IP carrier is to be used for the roaming leg, then the flow proceeds to step 430, wherein the gatekeeper retrieves a roaming number for the intended recipient by using, for example, the SendRoutingInfo MAP operation towards the HLR. Then, at step 440, the gatekeeper can translate the received roaming number into an IP address of the voice gateway at the VPLMN of the called user. The payload information can then be sent directly to that address from the gatekeeper as indicated at step 450. If, on the other hand, the PIC identity is something other than an IP carrier, e.g, a circuit switched carrier, then the gatekeeper will terminate the IP leg of the call at the voice gateway in the HPLMN at step 460.

Figure 7:
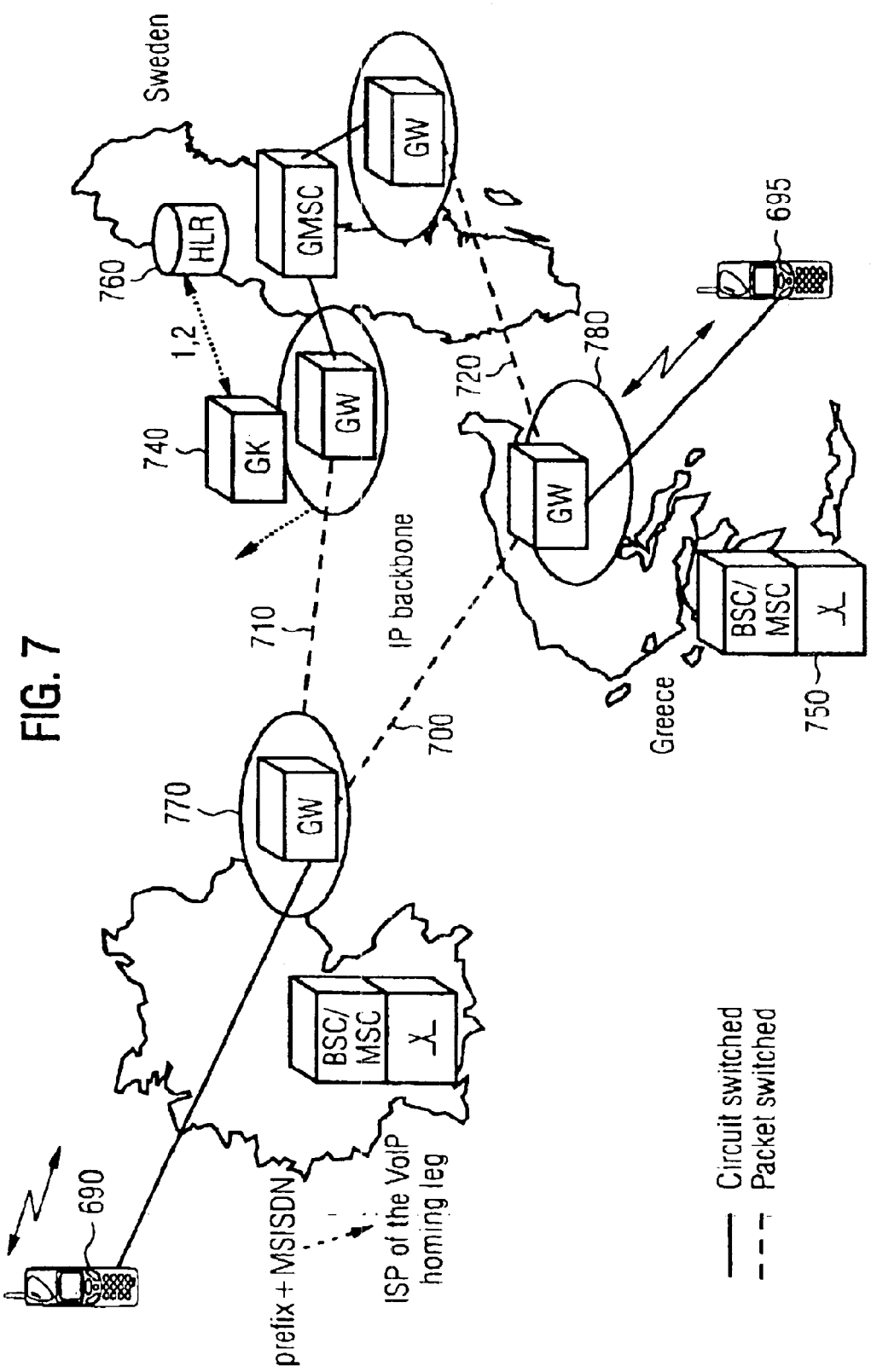
FIG. 7 is a is a diagram illustrating exemplary routing in accordance with the exemplary embodiment of FIG. 6.

This technique is conceptually depicted in FIG. 7. Therein, according to the present invention, the payload information to be communicated between terminal 690 and terminal 695 can be transmitted directly across IP link 700 rather than being routed through the called user's home system using links 710 and 720, thereby reducing the number of transcodings by at least two. The gatekeeper 740 determines that the roaming leg (720) is a VoIP leg from, e.g., a prefix transmitted by terminal 690 with the MSISDN. Then, the roaming number associated with the BSC/MSC 750 currently serving recipient terminal 695 is acquired from HLR 760. The gatekeeper 740 then instructs gateway 770 to forward the payload information directly to gateway 780 using the roaming number obtained from HLR 760. This results in improved speech quality and eliminates speech delays encountered at the converting devices. Moreover, by maintaining the call in the IP domain, speech path optimization is achieved for the payload, which in turn provides the ITSP with the opportunity to control the routing and minimize the router hops on its IP backbone network.

According to another exemplary embodiment of the present invention, additional transcoding steps (possibly all transcoding) can be avoided if the communication nodes can agree on a single encoding, that is if so calcd "tandem free operation" (TFO) can be made to work end-to-end for IP-telephony. In the general case, this would imply voice gateways being able to extend TFO negotiation on the circuit switched call legs towards the IP call legs and vice versa.

By combining inband signalling (e.g., as set forth in GSM TS 04.53, which is incorporated here by reference) through the telephony exchanges and outband signalling in the IP network (e.g., as set forth in H.245, SDP, RTCP, which documents are incorporated here by reference), it is possible to achieve one encoding and one decoding of the speech, end-to-end, when a mobile subscriber is involved. Alternatively, this method can be used on parts of the call to minimize the number of transcodings. By negotiating a suitable format of encoded speech between the nodes involved in the routing, the bandwidth used in the IP network can be minimized.

More specifically, additional transcoding can be reduced by applying the GSM codec and the emerging GSM Tandem Free Operation standard between every GSM BSC and every VoIP gateway, thus avoiding the present transcoding in the BSCs. In the case that the VoIP gateways involved in the call are under the control of the same service provider, they can be configured to use the GSM codec over the IP legs resulting in end-to-end transcoding for a mobile-to-mobile VoIP call.

Figure 8:
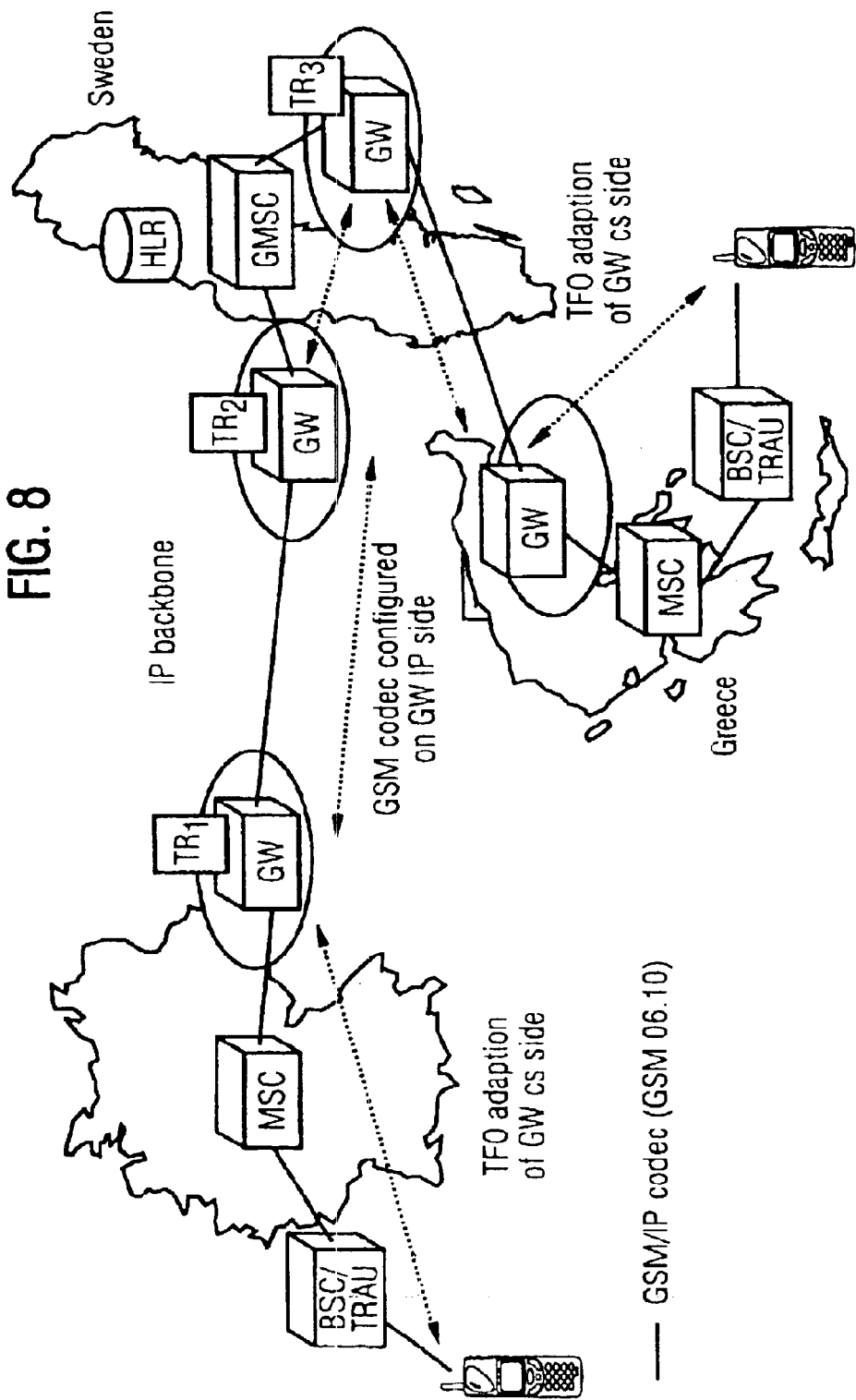
FIG. 8 is a diagram illustrating an further exemplary embodiment in accordance with the present invention.

In the general case where the VoIP GWs belong to different service providers, end-to-end transcoding can be achieved by deploying a logic that maps the inband TFO codec negotiation on the circuit switched leg with an outband H.245/SDP codec negotiation clone over the IP leg. This can be done immediately after the call set-up resulting in a codec re-negotiation between the end-points participating in the call. Also if, during the call, poor radio conditions are encountered then if an adaptive, multi-rate codec is available on the mobile station, a dynamic adaptation to a lower, codec bit-rate can be agreed end-to-end. These concepts are illustrated in FIG. 8.

According to this exemplary embodiment of the present invention, better speech quality in a call involving mobile subscriber(s) is available when the call traverses both a telephony exchange and an IP network. At the same time the bandwidth used in the IP network is minimized.

Although the invention has been described in detail with reference only to a few exemplary embodiments, those skilled in the art will appreciate that various modifications can be made without departing from the invention. Accordingly, the invention is defined only by the following claims which are intended to embrace all equivalents thereof.

What is claimed is:

1. A method for routing a call between an originating station and a terminating station in a communication network that includes one or more packet switched legs, a first visited network associated with said terminating station and a second visited network associated with said originating station, said first and second visited networks each having a voice gateway, comprising the steps of:

evaluating call information associated with said call at a call control point;

routing said call to said terminating station directly over one of said one or more packet switched legs to said first visited network based on said call information such that a quality level of said call is optimized by negotiating an end-to-end encoding between said originating station and said terminating station, wherein said negotiating further comprises:

first signaling using out-of-band signaling within said one of said one or more packet switched legs; and second signaling using inband signaling through said first and second voice gateways away from said one of said one or more packet switched legs.

2. The method of claim 1, wherein said call information includes an identity associated with said terminating station.

3. The method of claim 2, wherein said call information further includes carrier information associated with said terminating station.

4. The method of claim 3, wherein said carrier information includes a carrier type for use in routing said call to said terminating station.

5. The method of claim 4, wherein said step of routing further includes the step of routing said call according to said carrier type.

6. The method of claim 5, wherein said carrier type further includes a circuit switched carrier.

7. The method of claim 5, wherein said carrier type further includes a packet switched carrier.

8. The method of claim 7, further comprising the step of:

retrieving a roaming number for said terminating station.

9. The method of claim 6, wherein said communication system further includes a gateway mobile switching center (GMSC), a visited network associated with said originating station, a home network associated with said terminating station, and a homing packet switched leg associated with said originating station, and wherein said method further comprises the steps of:

terminating said homing packet switched leg at said home network; and routing said call to said terminating station through said GMSC.

10. The method of claim 2, wherein said identity includes a PIC identity associated with said terminating station.

11. The method of claim 1, wherein said step of routing further includes the steps of:

first extending tandem free operation (TFO) negotiation between said originating station and said terminating station from said first and second voice gateways toward said one of said one or more packet switched legs; and second extending said TFO negotiation from said one of said one or more packet switched legs toward said first and second voice gateways.

12. The method of claim 1, wherein said inband signaling includes GSM TS 04.53 based signaling.

13. The method of claim 12, wherein said out-of-band signaling includes H.245 based signaling.

14. The method of claim 1, wherein said call information further includes a user profile.

15. A system for routing a call between an originating station and a terminating station in a communication network that includes a visited network associated with said terminating station, and one or more packet switched legs, a first visited network associated with said terminating station and a second visited network associated with said originating station, said first and second visited networks each having a voice gateway, wherein said step of negotiating said end-to-end encoding further includes:

a packet switched backbone;

a gatekeeper node coupled to said packet switched backbone, said gatekeeper node configured to:

evaluate call information associated with said call; and route said call to said terminating station directly over one of said one or more packet switched legs to said terminating visited network based on said call information such that a quality level of said call is optimized by;

negotiating an end to end encoding between said originating station and said terminating station, wherein said negotiating further comprises:

first signaling using out-of-band signaling within said one of said one or more packet switched legs; and second signaling using inband signaling through said first and second voice gateways away from said one of said one or more packet switched legs.

16. The system of claim 15, wherein said call information includes an identity associated with said terminating station.

17. The system of claim 16, wherein said call information further includes carrier information associated with said terminating station.

18. The system of claim 17, wherein said carrier information includes a carrier type for use in routing said call to said terminating station.

19. The system of claim 18, wherein said step of routing further includes the step of routing said call according to said carrier type.

20. The system of claim 19, wherein said carrier type further includes a circuit switched carrier.

21. The system of claim 19, wherein said carrier type further includes a packet switched carrier.

22. The system of claim 21, said method further comprising:

means for retrieving a roaming number for said terminating station.

23. The system of claim 20, further comprising:

a gateway mobile switching center (GMSC);

a home network associated with said terminating station; and a homing packet switched leg associated with said originating station; wherein said gatekeeper is further configured to:

terminate said homing packet switched leg at said home network; and route said call to said terminating station through said GMSC.

24. The system of claim 23, further comprising:

a voice gateway associated with each of said first and second visited networks; wherein said gatekeeper is further configured to:

first extend tandem free operation (TFO) negotiation between said originating station and said terminating station from said first and second voice gateways toward said one of said one or more packet switched legs; and second extend said TFO negotiation from said one of said one or more packet switched legs toward said first and second voice gateways.

25. The system of claim 24, wherein said call information further includes a user profile.

26. The system of claim 16, wherein said identity includes a PIC identity associated with said terminating station.

27. The system of claim 15, wherein said inband signaling includes GSM TS 04.53 based signaling.

28. The system of claim 27, wherein said out-of-band signaling includes H.245 based signaling.

* * * * *